US012566854B2

(12) United States Patent
Yi et al.

(10) Patent No.: US 12,566,854 B2
(45) Date of Patent: Mar. 3, 2026

(54) METHOD FOR DETECTING MOBILE MALICIOUS APPLICATION BASED ON IMPLEMENTATION FEATURES, RECORDING MEDIUM, AND DEVICE FOR PERFORMING THE METHOD

(71) Applicant: Foundation of Soongsil University-Industry Cooperation, Seoul (KR)

(72) Inventors: Jeong Hyun Yi, Seoul (KR); Hae Hyun Cho, Seoul (KR); Sun Jun Lee, Seoul (KR); Young Hoon Ban, Incheon (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 90 days.

(21) Appl. No.: 18/696,479

(22) PCT Filed: Apr. 1, 2022

(86) PCT No.: PCT/KR2022/004672
§ 371 (c)(1),
(2) Date: Mar. 28, 2024

(87) PCT Pub. No.: WO2023/096035
PCT Pub. Date: Jun. 1, 2023

(65) Prior Publication Data
US 2024/0386105 A1 Nov. 21, 2024

(30) Foreign Application Priority Data

Nov. 25, 2021 (KR) ........................ 10-2021-0164905
Jan. 10, 2022 (KR) ........................ 10-2022-0003539

(51) Int. Cl.
| | | |
|---|---|---|
| *G06F 21/56* | (2013.01) | |
| *G06F 8/53* | (2018.01) | |
| *H04W 12/30* | (2021.01) | |

(52) U.S. Cl.
CPC .............. *G06F 21/566* (2013.01); *G06F 8/53* (2013.01); *G06F 21/56* (2013.01); *H04W 12/35* (2021.01)

(58) Field of Classification Search
CPC .......... G06F 21/566; G06F 8/53; G06F 21/56; H04W 12/35
See application file for complete search history.

(56) References Cited

U.S. PATENT DOCUMENTS

| | | | |
|---|---|---|---|
| 8,713,679 B2 | 4/2014 | Zorn et al. | ...................... 726/23 |
| 10,581,879 B1 * | 3/2020 | Paithane | ............... G06F 21/566 |

(Continued)

FOREIGN PATENT DOCUMENTS

| | | |
|---|---|---|
| CN | 109241739 B | 1/2021 |
| KR | 10-1228899 B1 | 2/2013 |

(Continued)

OTHER PUBLICATIONS

Rozi, Muhammad Fakhrur; Kim, Sangwook; Ozawa, Seiichi; "Deep Neural Networks for Malicious JavaScript Detection Using Bytecode Sequences," International Joint Conference on Neural Networks (IJCNN), Glasgow, UK, Jul. 19-24, 2020, IEEE, pp. 1-8.*

(Continued)

*Primary Examiner* — Victor Lesniewski
(74) *Attorney, Agent, or Firm* — Stein IP, LLC

(57) ABSTRACT

A method for detecting a mobile malicious application is disclosed. The method includes decompiling a labeled application to remove preset information; extracting abstract syntax tree (AST) that is an implementation feature for each method; generating an AST node list; generating and vec- (Continued)

torizing the generated AST node list as a learning dataset for deep learning; generating a classification model by learning a vectorized learning dataset; and outputting a classification result of a target application based on the classification model.

10 Claims, 8 Drawing Sheets

(56) References Cited

U.S. PATENT DOCUMENTS

| | | | | |
|---|---|---|---|---|
| 11,574,053 B1* | 2/2023 | Chen | G06F 21/564 |
| 11,886,582 B1* | 1/2024 | Abdallah | G06N 3/045 |
| 2013/0167241 A1* | 6/2013 | Siman | G06F 16/245 |
| | | | 726/25 |
| 2015/0229673 A1* | 8/2015 | Lee | H04W 12/128 |
| | | | 726/1 |
| 2016/0156646 A1* | 6/2016 | Hsueh | G06N 20/00 |
| | | | 726/1 |
| 2018/0025162 A1* | 1/2018 | Jin | G06F 21/577 |
| | | | 726/25 |
| 2018/0121659 A1* | 5/2018 | Sawhney | G06F 21/566 |
| 2019/0294790 A1* | 9/2019 | Chang | G06F 21/563 |
| 2020/0404007 A1* | 12/2020 | Singh | G06F 16/24537 |
| 2021/0056211 A1* | 2/2021 | Olson | G06F 16/9027 |
| 2021/0099483 A1* | 4/2021 | Shukla | G06F 21/566 |
| 2021/0240825 A1* | 8/2021 | Kutt | G06F 21/563 |
| 2021/0256350 A1* | 8/2021 | Zhao | G06N 3/09 |
| 2021/0264029 A1* | 8/2021 | Yoo | G06F 16/9024 |
| 2022/0116411 A1* | 4/2022 | Melicher | G06F 21/566 |

FOREIGN PATENT DOCUMENTS

| | | |
|---|---|---|
| KR | 10-2019-0030490 A | 3/2019 |
| KR | 10-2096017 B1 | 4/2020 |
| KR | 10-2283054 B1 | 7/2021 |
| KR | 10-2021-0099886 A | 8/2021 |
| KR | 10-2302484 B1 | 9/2021 |

OTHER PUBLICATIONS

Blanc, Gregory; Miyamoto, Daisuke; Akiyama, Mitsuaki; Kadobayashi, Youki; "Characterizing Obfuscated JavaScript Using Abstract Syntax Trees: Experimenting with Malicious Scripts," 26th Int'l Conf on Advanced Information Networking and Applications Workshops, Fukuoka, Japan, Mar. 26-29, 2012, IEEE, pp. 344-351.*
Zhang, Jian et al. A Novel Neural Source Code Representation based on Abstract Syntax Tree. Published in: 2019 IEEE/ACM 41st International Conference on Software Engineering (ICSE). pp. 783-794, Aug. 25-31, 2019.
Blanc, Gregory et al. Characterizing Obfuscated JavaScript Using Abstract Syntax Trees: Experimenting with Malicious Scripts. Published in: 2012 26th International Conference on Advanced Information Networking and Applications Workshops. pp. 344-351, Mar. 26-29, 2012.

* cited by examiner

Pruning

FIG. 4

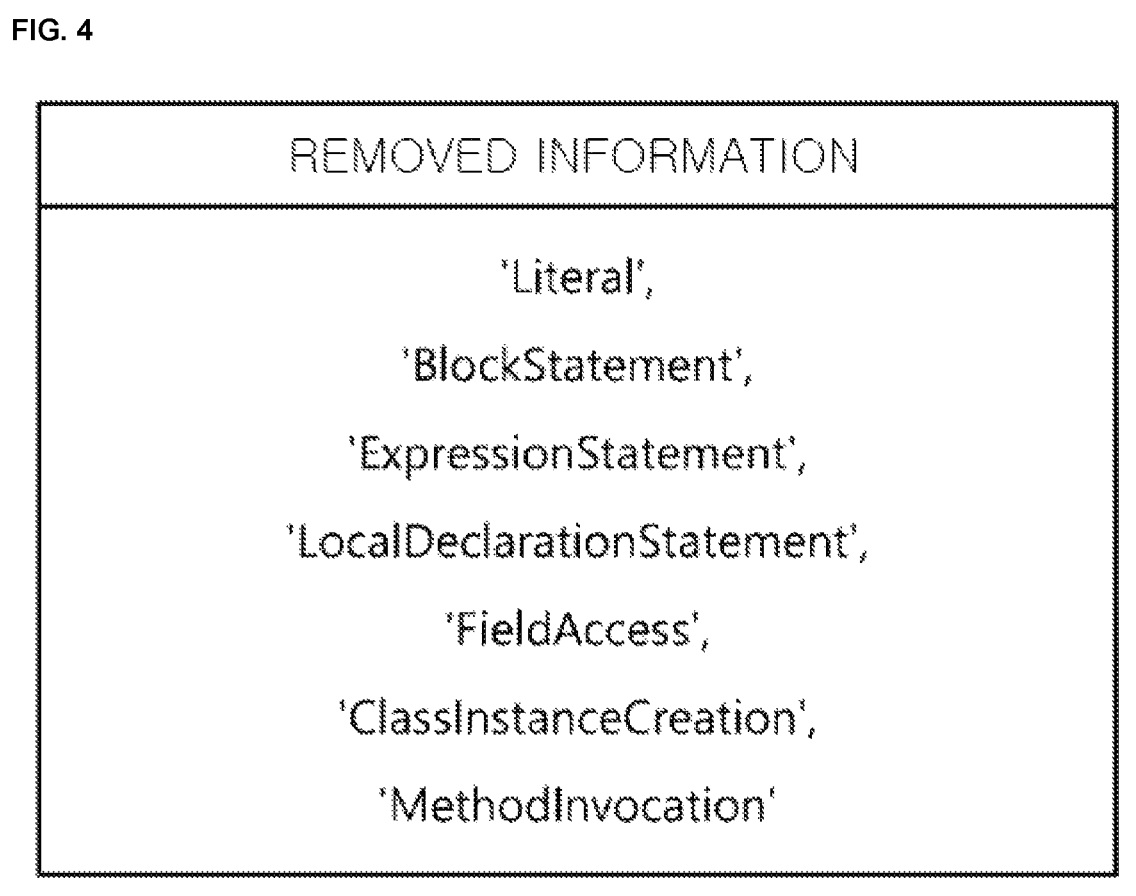

REMOVED INFORMATION

'Literal',

'BlockStatement',

'ExpressionStatement',

'LocalDeclarationStatement',

'FieldAccess',

'ClassInstanceCreation',

'MethodInvocation'

Figure 5:
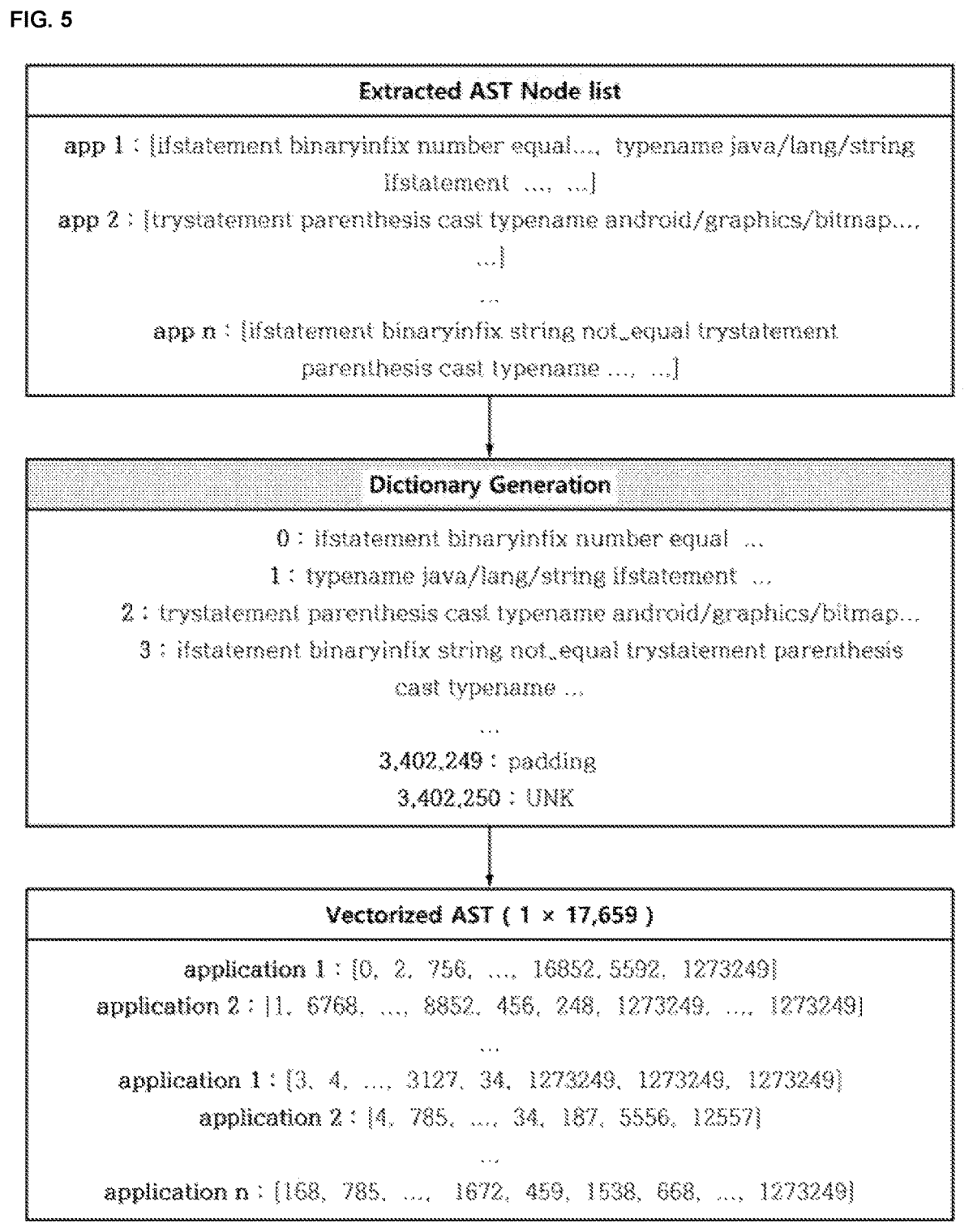

Extracted AST Node list app 1 : [ifstatement binaryinfix number equal..., typename java/lang/string
ifstatement ..., ...]

app 2 : [trystatement parenthesis cast typename android/graphics/bitmap...,
...]

...

app n : [ifstatement binaryinfix string not_equal trystatement
parenthesis cast typename ..., ...]

---

Dictionary Generation

0 : ifstatement binaryinfix number equal ...

1 : typename java/lang/string ifstatement ...

2 : trystatement parenthesis cast typename android/graphics/bitmap...

3 : ifstatement binaryinfix string not_equal trystatement parenthesis
cast typename ...

...

3,402,249 : padding 3,402,250 : UNK

---

Vectorized AST ( 1 × 17,659 )

application 1 : [0, 2, 756, ..., 16852, 5592, 1273249]

application 2 : [1, 6768, ..., 8852, 456, 248, 1273249, ..., 1273249]

...

application 1 : [3, 4, ..., 3127, 34, 1273249, 1273249, 1273249]

application 2 : [4, 785, ..., 34, 187, 5556, 12557]

...

application n : [168, 785, ..., 1672, 459, 1538, 668, ..., 1273249]

FIG. 6

| Data | Count | Labeling |
|---|---|---|
| Google Play | 8,500 | 8,500 |
| VirusShare_2018 | 28,632 | 16,346 |
| VirusShare_2019 | 66,704 | 5,126 |
| VirusShare_2020 | 94,511 | 6,707 |

FIG. 7

|  | Recall | Precision | F1-Score |
|---|---|---|---|
| CNN | 0.75 | 0.92 | 0.82 |
| GRU | 0.79 | 0.88 | 0.82 |
| CNN+GRU | 0.80 | 0.90 | 0.84 |

FIG. 8

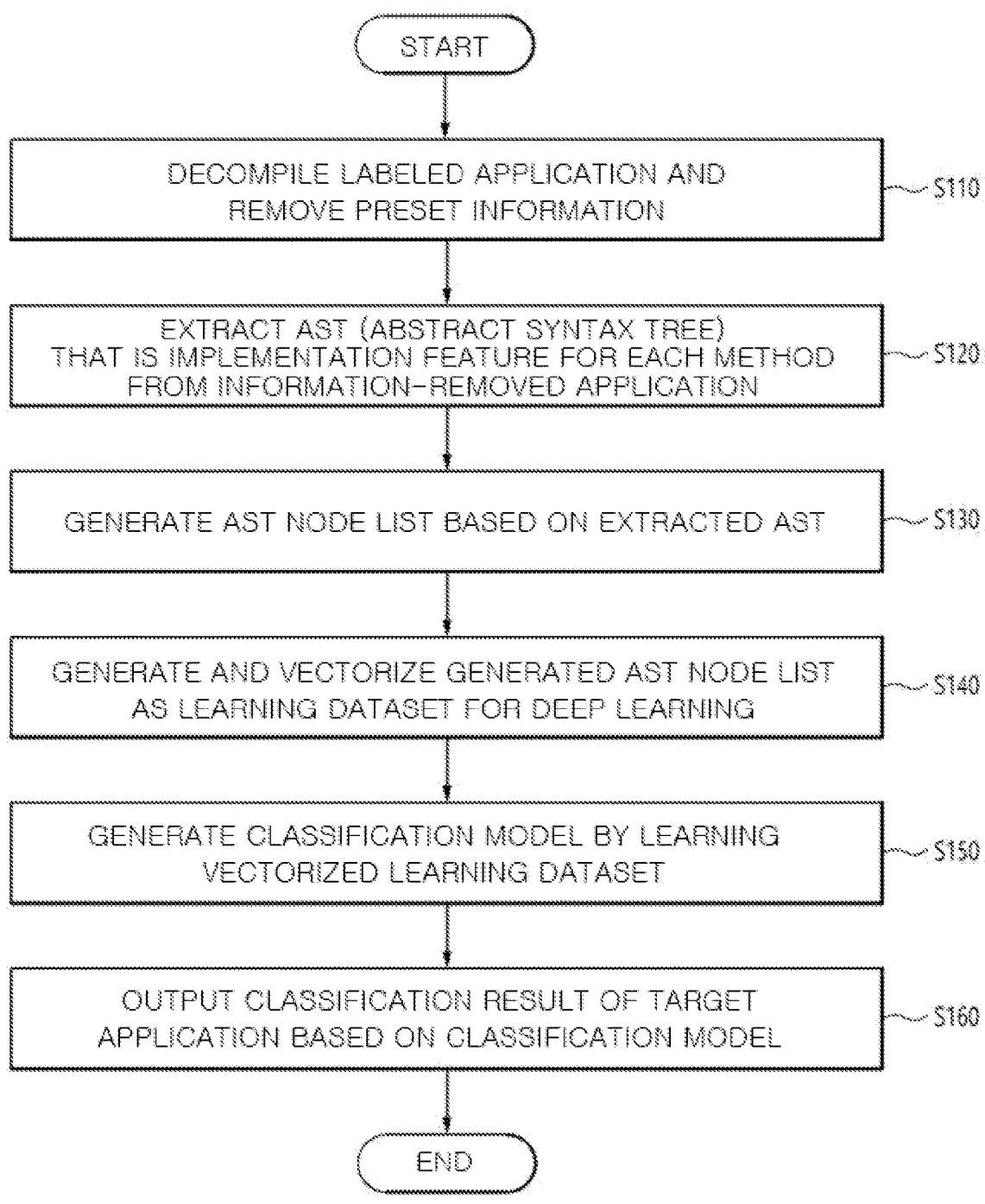

START

DECOMPILE LABELED APPLICATION AND
REMOVE PRESET INFORMATION — S110

EXTRACT AST (ABSTRACT SYNTAX TREE)
THAT IS IMPLEMENTATION FEATURE FOR EACH METHOD — S120
FROM INFORMATION-REMOVED APPLICATION

GENERATE AST NODE LIST BASED ON EXTRACTED AST — S130

GENERATE AND VECTORIZE GENERATED AST NODE LIST
AS LEARNING DATASET FOR DEEP LEARNING — S140

GENERATE CLASSIFICATION MODEL BY LEARNING
VECTORIZED LEARNING DATASET — S150

OUTPUT CLASSIFICATION RESULT OF TARGET
APPLICATION BASED ON CLASSIFICATION MODEL — S160

END

METHOD FOR DETECTING MOBILE MALICIOUS APPLICATION BASED ON IMPLEMENTATION FEATURES, RECORDING MEDIUM, AND DEVICE FOR PERFORMING THE METHOD

CROSS-REFERENCE TO RELATED APPLICATIONS

This application is a national stage of International Application No. PCT/KR2022/004672, filed Apr. 1, 2022, which claims the benefit of Korean Application No. 10-2021-0164905, filed Nov. 25, 2021, and Korean Application No. 10-2022-0003539, filed Jan. 10, 2022, in the Korean Intellectual Property Office, the disclosures of which are incorporated herein by reference.

TECHNICAL FIELD

The present invention relates to a method for detecting mobile malicious applications based on implementation features, a recording medium and apparatus for performing the same, and more specifically, it relates to a method for detecting mobile malicious applications based on implementation features that can detect malicious applications based on behavior, a recording medium and apparatus for performing the same.

BACKGROUND ART

As the IoT market continues to grow, IoT devices are increasing every year, and as the importance of mobile devices increases in this environment, the mobile application market is also growing rapidly. As a result, the scale of mobile application malicious code is increasing day by day.

According to some reports, the number increased from about 20 million in 2017 to about 36 million in 2019. Malicious applications continue to be created rapidly, at an average rate of about 15 per minute. As of December 2019, Android accounts for a very high share of the operating system used in mobile devices worldwide, at a whopping 74%. Android mobile applications are also widely used.

However, Android applications have many vulnerabilities because they can be easily copied, modified, and distributed illegally due to the open market policy. As a result, repackaging attacks are causing a lot of damage, such as financial losses and leaks of personal information and passwords.

Therefore, there is a need to protect users by more precisely detecting applications that perform malicious behaviors among mobile applications. Existing malicious behavior detection includes analysis methods based on permissions, descriptions, and user reviews, but since the limitations in detecting malicious behavior are clearly evident, a method that can accurately detect the malicious behavior itself is needed.

In addition, mobile malicious application detection methods using deep learning are mainly used to classify applications as normal or malicious by statically analyzing the application and characterizing the API (Application Programming Interface), permissions, and opcodes included in the application. Additionally, there are detection methods that use deep learning and machine learning algorithms by combining various characteristics of the application.

However, in the case of API, which is a feature that can detect actual behavior for malicious application detection, there is a limitation in that the number of APIs that can be used as a feature when classifying obfuscated applications is limited, which means that there is a problem in that false detection in application detection is highly likely.

RELATED ART

Korean Patent Registration No. 10-1228899

DISCLOSURE

Technical Issues

The present invention was created to solve the above problems, and the purpose of the present invention is to reduce the false positive rate by removing normal libraries used in the application in order to perform accurate application detection and extract many features from the obfuscated application. Accordingly, it is to provide a mobile malicious application detection method based on implementation features that can detect malicious applications by classifying mobile applications as normal or malicious behavior based on the behaviors performed by the application, and a recording medium and apparatus for performing the same.

Technical Solution

In order to achieve the above object, according to an embodiment of the present invention, a method for detecting a mobile malicious application based on an implementation feature in a mobile malicious application detection apparatus based on an implementation feature comprises decompiling a labeled application to remove preset information; extracting abstract syntax tree (AST) that is an implementation feature for each method from the application from which the information has been removed; generating an AST node list based on the extracted AST; generating and vectorizing the generated AST node list as a learning dataset for deep learning; generating a classification model by learning a vectorized learning dataset; and outputting a classification result of a target application based on the classification model.

Further, the labeled application may be labeled as one of normal behavior or malicious behavior.

Further, the removed preset information in the removing may be at least one of a framework library, a third-party library (TPL), and a resource access file.

Further, the extracting may comprise removing redundant information from the extracted AST and identifying usable information to reconfigure the AST in a graph form.

Further, the extracting may comprise converting text and constant used in the AST to specific values, and configuring API and data type used in the AST as a framework API list to identify the usable information.

Further, the generating the AST node list may comprise generating the AST node list by traversing the reconfigured AST using depth-first search (DFS) if the API included in the AST reconfigured in the graph form is in a pre-configured API list.

In order to achieve the above object, according to an embodiment of the present invention, a computer program for performing the method for detecting a mobile malicious application based on the implementation feature is recorded on a computer-readable storage medium.

In order to achieve the above object, according to an embodiment of the present invention, an apparatus for detecting a mobile malicious application based on an implementation feature comprises a removal unit that decompiles a labeled application to remove preset information; an AST extraction unit that extracts abstract syntax tree (AST) that is an implementation feature for each method from the application from which the information has been removed; an AST preprocessing unit that generates an AST node list based on the extracted AST; an AST node list vectorization unit that generates and vectorizes the generated AST node list as a learning dataset for deep learning; an AST learning unit that generates a classification model by learning the vectorized learning dataset; and an AST classification unit that outputs a classification result of a target application based on the classification model.

Further, the labeled application may be labeled as one of normal behavior or malicious behavior.

Further, the removed preset information may be at least one of a framework library, a third-party library (TPL), and a resource access file.

Further, the AST extraction unit may remove redundant information from the extracted AST and identify usable information to reconfigure the AST in a graph form.

Further, the AST extraction unit may convert text and constant used in the AST to specific values, and configure API and data type used in the AST as a framework API list to identify the usable information.

Further, the AST preprocessing unit may generate the AST node list by traversing the reconfigured AST using depth-first search (DFS) if the API included in the AST reconfigured in the graph form is in a pre-configured API list.

Further, the AST classification unit may calculate the probability of a label, into which the target application will be classified, and classify a label with the highest probability as a label of the target application.

Advantageous Effects

According to one aspect of the present invention described above, a method for detecting mobile malicious applications based on implementation features, a recording medium, and an apparatus for performing the same are provided. In the method, normal libraries used in the application are removed to perform accurate application detection, thereby reducing the false positive rate. Further, it extracts many features from the obfuscated application and classifies mobile applications as normal or malicious behaviors based on the behavior performed by the application to detect malicious applications.

BRIEF DESCRIPTION OF DRAWINGS

These and/or other aspects will become apparent and more readily appreciated from the following description of the embodiments, taken in conjunction with the accompanying drawings in which:

FIGS. 3 and 4 are diagrams showing an example of a method for generating an AST node list in the preprocessing unit;

FIG. 5 is a diagram showing an example of a conversion form of an AST node list;

FIG. 6 is a diagram illustrating a learning data set for learning;

FIG. 7 is a diagram showing the performance evaluation results of the classification model generated by the AST learning unit; and FIG. 8 is a flowchart of a mobile malicious application detection method based on implementation features according to an embodiment of the present invention.

DETAILED DESCRIPTION OF EMBODIMENTS

Figure 1:
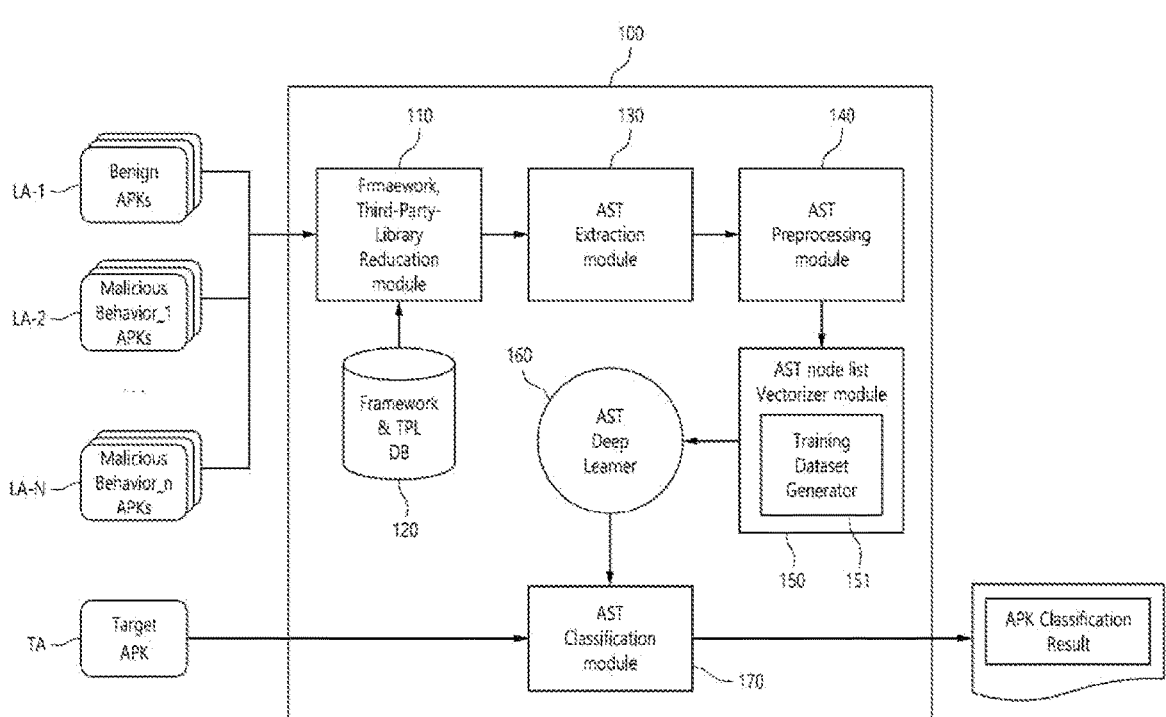
FIG. 1 is a diagram illustrating the configuration of a mobile malicious application detection apparatus based on implementation features according to an embodiment of the present invention.

The detailed description of the present invention which follows refers to the accompanying drawings which illustrate, by way of illustration, specific embodiments in which the present invention may be practiced. These embodiments are described in sufficient detail to enable those skilled in the art to practice the present invention. It should be understood that the various embodiments of the present invention are different from each other but are not necessarily mutually exclusive. For example, specific shapes, structures, and characteristics described herein may be implemented in another embodiment without departing from the spirit and scope of the invention in connection with one embodiment. Additionally, it should be understood that the location or arrangement of individual components within each disclosed embodiment may be changed without departing from the spirit and scope of the invention. Accordingly, the detailed description set forth below is not to be taken in a limiting sense, and the scope of the present invention, if properly described, is limited only by the appended claims, along with all equivalents as claimed by those claims. Like reference numbers in the drawings indicate the same or similar function throughout the various aspects.

Hereinafter, preferred embodiments of the present invention will be described in more detail with reference to the drawings.

Figure 2:
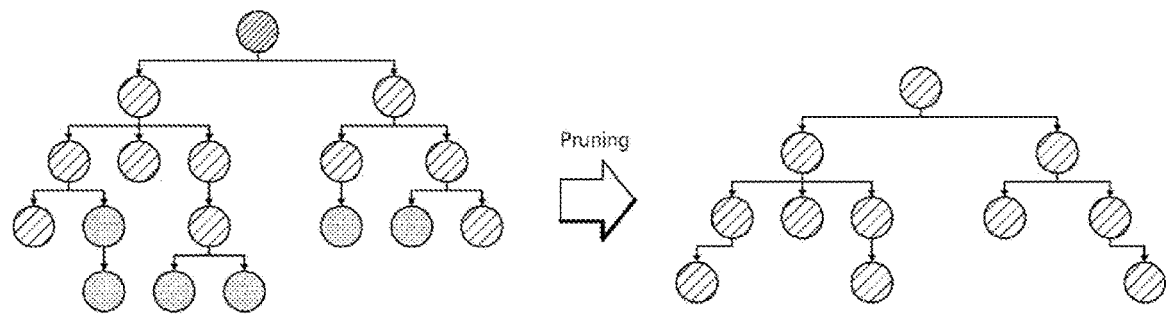
FIG. 2 is a diagram showing an example of a method for extracting AST from the extraction unit.
Figure 3:
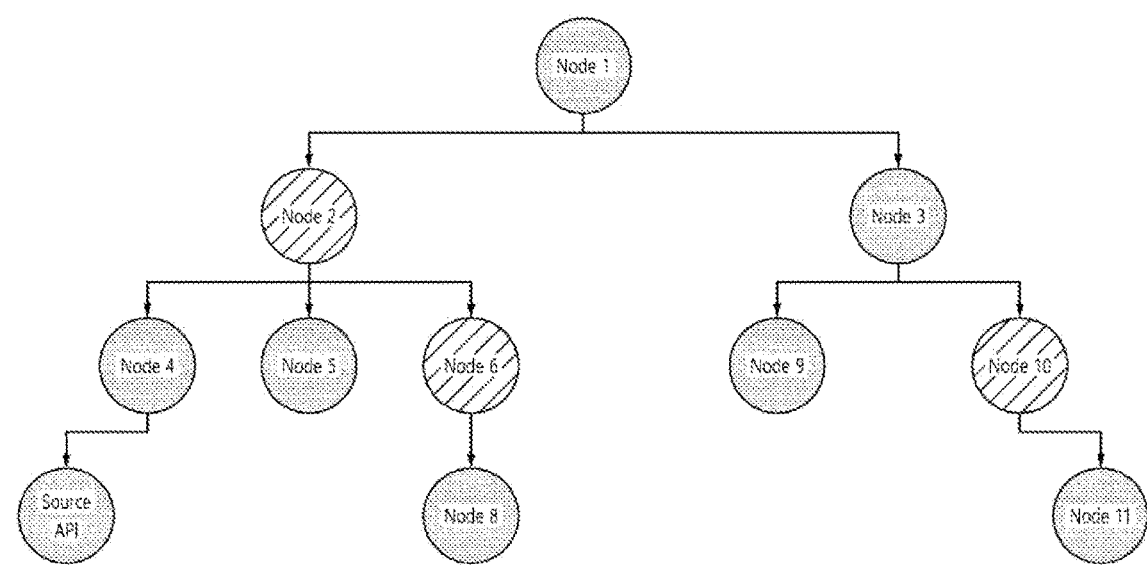

FIG. 1 is a diagram illustrating the configuration of a mobile malicious application detection apparatus 100 based on implementation features according to an embodiment of the present invention, and FIG. 2 is a diagram showing an example of a method for extracting an AST in the extraction unit 130, FIGS. 3 and 4 are diagrams showing an example of a method for generating an AST node list in the preprocessing unit 140, and FIG. 5 is a diagram showing an example of a conversion form of the AST node list.

To detect newly emerging malicious applications, various conventional technologies use deep learning and machine learning, which classify applications as malicious or benign or into specific product families based on features obtained through static/dynamic analysis. However, there is a problem that the dataset used to generate the model is not suitable for detecting newly emerging malicious applications because it uses data that was labeled a long time ago.

Additionally, the recent Android application market uses Third-Party-Library (TPL) to develop excellent applications at a low cost. Due to the efficiency of Android application development, more than 60% of the code of recently released Android applications is TPL code, but most conventional technologies do not consider TPL. As a result, application analysis and classification may not be performed correctly.

Accordingly, the mobile malicious application detection apparatus 100 according to an embodiment of the present invention removes well-known libraries and TPLs to detect malicious behavior by using the implementation features of methods that cause malicious behavior in malicious applications. It can be designed to detect malicious applications by focusing on the behaviors performed by unknown methods.

The mobile malicious application detection apparatus 100 (hereinafter referred to as apparatus) based on implementation features according to the present invention can detect features of malicious applications based on AST, which is the implementation features of the application.

AST stands for Abstract Syntax Tree and preserves the order and execution order of the application's source code and contains various semantic information. Accordingly, by focusing on the behaviors performed by malicious applications, it is possible to classify malicious applications by each behavior using AST, which is a feature that can express behaviors from methods that cause malicious behaviors.

Accordingly, in order to detect malicious applications based on AST, that is, implementation features, unnecessary or redundant information is removed from already labeled malicious applications, AST is extracted for each method, and a learning dataset is generated using the extracted AST.

Afterward, the learning dataset is vectorized so that the deep learning algorithm can receive it, and input it into the deep learning algorithm and learned. Once learning is complete, the classification results of the target application (TA) can be provided using the completed classification model.

To this end, as shown in FIG. 1, the apparatus 100 according to the present invention may comprise a removal unit 110, an AST extraction unit 130, an AST preprocessing unit 140, an AST node list vectorization unit 150, and an AST learning unit 160 and an AST classification unit 170.

In addition, the apparatus 100 of the present invention can be installed and executed with software (application) for detecting mobile malicious applications based on implementation features, and the above removal unit 110, AST extraction unit 130, and AST preprocessing unit 140, AST node list vectorization unit 150, AST learning unit 160, and AST classification unit 170 can be controlled by software running on the apparatus 100 for detecting mobile malicious applications based on implementation features.

And the apparatus 100 may be a separate terminal or a partial module of the terminal. In addition, the removal unit 110, AST extraction unit 130, AST preprocessing unit 140, AST node list vectorization unit 150, AST learning unit 160, and AST classification unit 170 can be formed as an integrated module. Alternatively, it may consist of one or more modules. However, on the contrary, each configuration may be made up of a separate module.

Additionally, the apparatus 100 may be mobile or fixed, may be in the form of a server or engine, and may be called by other trams such as a device, apparatus, terminal, user equipment (UE), MS (mobile station), wireless device, or handheld device.

And the apparatus 100 can execute or produce various software based on an operating system (OS), that is, a system. The operating system is a system program that allows software to use the hardware of the apparatus, and may comprise both mobile computer operating systems such as Android OS, iOS, Windows Mobile OS, Bada OS, Symbian OS, Blackberry OS, and computer operating systems such as Windows series, Linux series, Unix series, MAC, AIX, and HP-UX.

The removal unit 110 may decompile the labeled applications (LA-1, LA-2, LA-N) and remove preset information. This removal unit 110 can use VirusTotal and Avclass2 for data labeling, which specifies a label for the behavior using implementation features of the malicious application, and can specify a label for what behavior the malicious application performs.

Virus Total is a website that scans files using about 70 anti-virus products. It collects the detection results of each product and provides them as a report in json format. The way each product expresses the detection results and the order in which the information is arranged may vary from product to product. Avclass2 can receive the report file that is the result of Virus Total and provide information such as the application's file information, behavior, class, and family through a series of processing processes.

Accordingly, the removal unit 110 can decompile the applications (LA-1, LA-2, LA-N) labeled as either normal or malicious behavior and remove preset information, where the preset information may comprise at least one of the Framework Library, TPL (Third-Party-Library), and resource access file.

In addition, the removal unit 110 can traverse the smali directory, which is a directory containing the source files of the application, and remove the Framework Library, Third-Party-Library (TPL), and resource access-related files.

At this time, the apparatus 100 may further comprise a database unit 120, and it could be a database that consists of a pre-secured TPL, a framework package, and a TPL white list.

Additionally, a framework library used in the application can be used to configure the database unit 120, and the framework package list crawled by Android Developer can be used to remove well-known libraries such as TPL.

The database unit 120 shown in FIG. 1 can be generated using the generated TPL white list and framework library list. Using the database unit 120 generated in this way, the apparatus 100 can remove well-known libraries included in the application and generate an application that has only unknown libraries.

In order to secure normal framework libraries used in Android applications, a white list of framework libraries provided by Android developers and Android studios was secured. In order to secure a well-known TPL, the TPL was secured using Up2Dep, a study that detects TPL included in an application. Additionally, to secure an additional TPL white list, Libd, which is a TPL detection tool, and LiLi et al., which automatically collects common libraries from applications are used. Securing the white list of the above-described libraries for configuring the database unit 120 is not necessarily limited to this, and can be stored or received in advance in various ways.

Meanwhile, the AST extraction unit 130 may extract an AST (Abstract Syntax Tree), which is an implementation feature, for each method from the application from which preset information has been removed in the removal unit 110.

In addition, the AST extraction unit 130 extracts the AST for methods, removes unnecessary or redundant information from the extracted AST, identifies usable information, and reconstructs the AST in the form of a graph. An example of a method for extracting AST from the AST extraction unit 130 is shown in FIG. 2.

Specifically, the AST extraction unit 130 may remove information used in Register nodes that are not required for detecting malicious applications based on implementation features, and convert information used in Literal nodes into specific information to generate a tree.

At this time, the AST extraction unit 130 converts the text and constants used in the AST into specific values, and configures the API and data type used in the AST into a framework API list to identify usable information. By doing this, APIs and data types whose behavior and type cannot be specified can be identified and removed from the extracted AST.

For example, the AST extraction unit 130 may use the framework library white list used to generate the database unit 120 to identify APIs and data types, whose behavior and type cannot be specified, and convert them into 'User_define_api' and 'User_define_type.' Additionally, the AST extraction unit 130 can convert the information of the Literal node into 'string,' 'number,' 'null,' and 'special_string' through inspection and use it.

The AST extraction unit 130 can use only the API Triple node as a node related to the API because the API Triple node contains detailed information about the API. Specifically, since the API Triple node contains API NAME information, the API NAME node, which is redundant information, can be removed and only the API Triple node can be used.

Therefore, by removing the framework library and TPL, the apparatus 100 can focus only on methods that cause malicious behavior in applications labeled as malicious behavior.

Meanwhile, the AST preprocessing unit 140 may be provided to generate an AST node list based on the AST extracted by the extraction unit 130.

If the API included in the AST reconfigured in a graph form by the extraction unit 130 is in a pre-built API list, the AST preprocessing unit 140 can traverse the reconfigured AST using a DFS (Depth First Search) to generate an AST node list.

To this end, the AST preprocessing unit 140 can inspect the API used in the AST in the process of generating the AST node list. In general, many malicious behaviors deal with data related to the user's personal information, so ASTs that use the Source API for data input and the Sink API for data output are selected and used.

Therefore, the AST preprocessing unit 140 can select and use only ASTs that use the Source API for data input and the Sink API for data output. Accordingly, the AST preprocessing unit 140 can use SuSi and Flowdroid to check the Source API or Sink API.

An example of a method for generating an AST node list in the AST preprocessing unit 140 is shown in FIGS. 3 and 4. These nodes are necessary to configure a tree as shown in FIG. 3, but when a node list is generated while traversing the DFS, information that is not required for behavior classification using implementation features can be removed.

Specifically, the AST preprocessing unit 140 can remove information about APIs and TYPEs that do not exist in the framework package list, that is, 'USER_DEFINE_API' and 'USER_DEFINE_TYPE', because it cannot be exactly known what behaviors are performed or what type of data they are.

Additionally, the AST preprocessing unit 140 can remove information that is necessary for AST configuration but is not required during the behavior classification process using implementation features.

Taking FIG. 3 as an example, among the entire tree (node 1 to node 11) required for AST configuration, if the information that is not required for generating the AST node list is node 2, node 6, and node 10, which are hatched nodes in the figure, the corresponding Nodes can be removed when generating an AST node list.

As shown in FIG. 4, the removed information may be 'Literal,' 'BlockStatement,' 'ExpressionStatement,' 'LocalDeclarationStatement,' 'FieldAccess,' 'ClassInstanceCreation,' and 'MethodInvocation.'

At this time, when the AST preprocessing unit 140 generates a node list to improve the performance of the deep learning model, the AST that uses the Source API can be placed forward, and the AST that uses the Sink API can be placed backward.

Meanwhile, the AST node list vectorization unit 150 may be provided to generate and vectorize the AST node list generated by the AST preprocessing unit 140 into a learning dataset for deep learning.

The AST node list vectorization unit 150 vectorizes the learning data set generated using the AST node list so that it can be used for deep learning. To this end, the AST node list vectorization unit 150 may comprise a learning data set generation unit 151 that builds a learning data set and an embedding unit (not shown) that vectorizes the AST node to use the learning data set as an input value for a deep learning algorithm.

An example of the conversion form of the AST node list in the AST node list vectorization unit 150 is shown in FIG. 5.

Specifically, the AST node list vectorization unit 150 may generate an indexed learning data set by mapping one index per AST node list so that the deep learning model can learn the AST node list data generated by the AST preprocessing unit 140.

By using the learning dataset generated in this way as an input to the embedding layer of the deep learning model, the process of vectorizing the AST node list mapped to a specific dimension can be performed. This vectorization can be performed because in order to learn through artificial intelligence models such as CNN or GRU, numerical data rather than natural language is required. Afterward, the vectorized data can be learned through a CNN or GRU algorithm in the AST learning unit 160, which will be described later.

Specifically, taking a CNN artificial intelligence model as an example, since a filter is applied to the data values during learning and a feature map is extracted through a convolution operation, the learning data cannot be used in the same language as normally used. Therefore, vectorization of the AST node list is necessary.

In the present invention, as an example, for vectorization, Tokenize was used, which is a method of assigning numbers to words by generating a dictionary of words existing in the AST node list and mapping integers. In addition, in the present invention, padding to match the size of the vector and the '_UNK_' token to ensure that it works well even for applications that were not used for learning are added so that the model can accurately classify even unobserved data during learning. Accordingly, a dictionary consisting of a total of 3,402,250 words is used.

Simply mapping numbers not only has a large dimension, but also does not include an explanation of the relationship between the data used, so vector values can be adjusted using an embedding layer. To input into the embedding layer, the size of the AST node list vector of each application can be adjusted using padding.

Meanwhile, the AST learning unit 160 may generate a classification model by performing learning using vectorized data that has been vectorized in the AST node list vectorization unit 150, that is, a learning dataset.

Specifically, the AST learning unit 160 can learn through the CNN algorithm or the GRU algorithm, and this deep learning model can extract and learn the features of malicious applications from the generated vector.

The AST classification unit 170 may output a classification result of the target application (TA) based on the classification model generated by the AST learning unit 160. When the AST classification unit 170 inputs or receives a target application (TA), which is an application that needs to be detected, the AST classification unit 170 can calculate the probability of a label by which the target application (TA) will be classified based on a classification model generated for the target application (TA). And, the label with the highest probability among the calculated probabilities can be classified as the label of the target application (TA) and the results can be output.

Hereinafter, the experimental process and results for verifying the effectiveness of the mobile malicious application detection apparatus 100 based on the implementation features according to an embodiment of the present invention will be described. FIG. 6 is a diagram illustrating a learning data set for learning, and FIG. 7 is a diagram showing the performance evaluation results of the classification model generated by the AST learning unit 160.

To verify the effectiveness of the mobile malicious application detection apparatus 100 based on the implementation features according to this embodiment, an experiment was conducted using artificial intelligence models, CNN, GRU, and CNN+GRU.

As a learning dataset, as shown in FIG. 6, VS2018-2020 data generated from 2018 to 2020 at VifusShare.com are used as the malicious applications, and 8,500 applications received from Google Play are used as the benign applications.

In addition, although there are a total of 84 multi-class labels, a model was generated that classifies applications into a total of 22 labels. Here, the 22 labels are consisted of 21 malicious behavior labels and 1 normal behavior label, and in order to quickly learn each model, only one Convolution, GRU layer, and Pooling Layer were used. At this time, the Pooling Layer was configured using max pooling, which has higher classification performance than average pooling.

Each model was learned with Epoch set to 50, Earlystopping was used to prevent overfitting of the deep learning model, and Dropout was set to 0.2. After comparing the loss for each learning cycle, the model with the lowest loss was saved and evaluated.

In addition, in order to evaluate the detection results for each model, learning and verification were conducted by dividing the dataset into a learning dataset and verification dataset at a ratio of 8:2. The detection results of malicious applications for each model performed in this way are shown in FIG. 7, and the evaluation criteria for each model were Recall, Precision, and F1-Score.

As a result, the mobile malicious application detection apparatus 100 based on the implementation features of the present invention, which extracts AST for methods that are actual behaviors performed by the application and classifies them according to the behaviors performed by the application, showed acceptable performance for all three models used in the experiment as a result of the experiment. In particular, the CNN+GRU model recorded higher performance than other models based on the F1-score.

Therefore, the mobile malicious application detection apparatus 100 based on the implementation features according to an embodiment of the present invention may reduce the false positive rate by removing normal libraries used in the application, extract many features from the obfuscated application, and classify mobile applications as normal or malicious behaviors to improve detection of malicious applications.

And the components according to the present invention are components defined by functional division, not physical division, and can be defined by the functions each performs. Each component may be implemented as hardware or program code and processing units that perform each function, and the functions of two or more components may be included and implemented in one component. Therefore, the names given to the components in the following embodiments are not intended to physically distinguish each component, but are given to suggest the representative function performed by each component, and It should be noted that the technical idea of the present invention is not limited by the names of the components. Meanwhile, FIG. 8 is a flowchart of a mobile malicious application detection method based on implementation features according to an embodiment of the present invention. The mobile malicious application detection method based on implementation features according to an embodiment of the present invention is carried out on substantially the same configuration as the mobile malicious application detection apparatus 100 based on implementation features according to an embodiment of the present invention shown in FIG. 1. Therefore, the same reference numerals will be assigned to the same components as those of the apparatus 100 in FIG. 1, and repeated descriptions will be omitted.

Additionally, the method for detecting mobile malicious applications based on implementation features according to this embodiment can be executed by software (application) for detecting mobile malicious applications based on implementation features.

The method for detecting mobile malicious applications based on implementation features according to the present invention detects the features of malicious applications based on AST, which is the implementation features of the application.

AST stands for Abstract Syntax Tree and preserves the order and execution order of the application's source code and contains various semantic information. Accordingly, by focusing on the behaviors performed by malicious applications, it is possible to classify malicious applications by each behavior using the AST which is a feature that can express behaviors from methods that cause malicious behaviors.

Accordingly, in order to detect malicious applications based on AST, that is, implementation features, unnecessary or redundant information is removed from already labeled malicious applications, AST is extracted for each method, and a learning dataset is generated using the extracted AST.

Afterward, the learning dataset is vectorized so that the deep learning algorithm can receive it, and then input it into the deep learning algorithm and learn. Once learning is complete, the classification results of the target application (TA) can be provided using the completed classification model.

Specifically, referring to FIG. 8, in the mobile malicious application detection method based on implementation features according to this embodiment, the labeled application is first decompiled to remove preset information (S110).

The application labeled here may be an application labeled as either normal or malicious behavior. The preset information removed in the removing step (S110) may be at least one of a framework library, a third-party library (TPL), and a resource access file.

Then, AST (Abstract Syntax Tree), an implementation feature, can be extracted for each method from the application from which preset information has been removed (S120). In the step of extracting this AST (S120), redundant information may be removed from the extracted AST, usable information may be identified, and the AST may be reconfigured in the form of a graph.

In addition, in the step of extracting the AST (S120), the text and constants used in the AST may be converted to specific values, and the API and data type used in the AST may be configured into a framework API list to identify usable information.

Afterward, an AST node list can be generated based on the extracted AST (S130). In the step of generating the AST node list (S130), if the API included in the AST reconfigured in a graph form is in the pre-built API list, the AST node list can be generated by traversing the reconfigured AST using Depth First Search (DFS).

The generated AST node list can be generated as a learning dataset for deep learning and vectorized (S140).

A classification model can be generated by learning the vectorized learning dataset (S150).

Afterwards, the classification result of the target application (TA) can be output based on the classification model (S160). In the step of outputting the classification result (S160), when the target application (TA) is input, the probability of the label by which the target application (TA) will be classified is calculated, and the label with the highest probability can be classified as the label of the target application (TA).

Therefore, according to the mobile malicious application detection method based on the implementation features of the present invention, in order to detect malicious behavior using the implementation features of methods that cause malicious behavior in malicious applications, malicious applications can be detected by removing the well-known libraries and TPLs and focusing on the behaviors performed by poorly known methods. Accordingly, it is expected that it will be possible to quickly respond to malicious behaviors and prevent damage caused by malicious behaviors.

The mobile malicious application detection method based on the implementation features of the present invention can be implemented in the form of program instructions that can be executed through various computer components and recorded on a computer-readable recording medium. The computer-readable recording medium may include program instructions, data files, data structures, etc., singly or in combination.

The program instructions recorded on the computer-readable recording medium may be specially designed and configured for the present invention, or may be known and usable by those skilled in the computer software field. Examples of the computer-readable recording media include magnetic media such as hard disks, floppy disks and magnetic tapes, optical recording media such as CD-ROMs and DVDs, and magneto-optical media such as floptical disks, and hardware devices specifically configured to store and perform program instructions, such as ROM, RAM, flash memory, etc.

Examples of the program instructions include not only machine language code such as that generated by a compiler, but also high-level language code that can be executed by a computer using an interpreter or the like. The hardware device may be configured to operate as one or more software modules to perform processing according to the invention and vice versa.

Although various embodiments of the present invention have been shown and described above, the present invention is not limited to the specific embodiments described above. The present invention can be modified and practiced by those skilled in the technical field to which the present invention pertains without departing from the gist of the present invention claimed in the claims, and these modifications should not be individually understood from the technical spirit or perspective of the present invention.

REFERENCE NUMERAL

100: mobile malicious application detection apparatus
110: removal unit
120: database unit
130: AST extraction unit
140: AST preprocessing unit
150: AST node list vectorization unit
151: learning dataset generation unit
160: AST learning unit
170: AST classification unit

The invention claimed is:

1. A method for detecting a mobile malicious application based on an implementation feature in a mobile malicious application detection apparatus based on an implementation feature comprising:

decompiling a labeled application to remove preset information;

extracting abstract syntax tree (AST) that is an implementation feature for each method from the application from which the information has been removed;

generating an AST node list based on the extracted AST;

generating and vectorizing the generated AST node list as a learning dataset for deep learning;

generating a classification model by learning a vectorized learning dataset; and outputting a classification result of a target application based on the classification model, wherein the extracting comprises, removing redundant information from the extracted AST for each method and identifying usable information to reconfigure the AST in a graph form, wherein the extracting comprises, converting text and constant used in the AST to specific values, configuring API and data type used in the AST as a framework API list, and removing an API and data type that cannot be specified as a particular behavior or type using a pre-secured list to identify the usable information.

2. The method of claim 1, wherein the labeled application is labeled as one of a normal behavior or a malicious behavior.

3. The method of claim 1, wherein the removed preset information is at least one of a framework library, a third-party library (TPL), and a resource access file.

4. The method of claim 1, wherein the generating the AST node list comprises, generating the AST node list by traversing the reconfigured AST using depth first search (DFS) if API included in the AST reconfigured in the graph form is in a pre-configured API list.

5. A non-transitory computer-readable storage medium, on which a computer program for performing the method for detecting a mobile malicious application based on the implementation feature according to claim 1 is recorded.

6. An apparatus for detecting a mobile malicious application based on an implementation feature comprises, a removal unit that decompiles a labeled application to remove preset information;

an AST extraction unit that extracts abstract syntax tree (AST) that is an implementation feature for each method from the application from which the information has been removed;

an AST preprocessing unit that generates an AST node list based on the extracted AST;

an AST node list vectorization unit that generates and vectorizes the generated AST node list as a learning dataset for deep learning;

an AST learning unit that generates a classification model by learning the vectorized learning dataset; and an AST classification unit that outputs a classification result of a target application based on the classification model, wherein the AST extraction unit removes redundant information from the extracted AST for each method and identifies usable information to reconfigure the AST in a graph form, wherein the AST extraction unit converts text and constant used in the AST to specific values, configures API and data type used in the AST as a framework API list, and removes an API and data type that cannot be specified as a particular behavior or type using a pre-secured list to identify the usable information.

7. The apparatus of claim 6, wherein the labeled application is labeled as one of a normal behavior or a malicious behavior.

8. The apparatus of claim 6, wherein the removed preset information is at least one of a framework library, a third-party library (TPL), and a resource access file.

9. The apparatus of claim 6, wherein the AST preprocessing unit generates the AST node list by traversing the reconfigured AST using depth first search (DFS) if API included in the AST reconfigured in the graph form is in a pre-configured API list.

10. The apparatus of claim 6, wherein the AST classification unit calculates probability of a label, into which the target application will be classified, and classifies a label with the highest probability as a label of the target application.

* * * * *